Aug. 1, 1950 R. J. COWLES 2,516,856

AUTOMATIC STOP-ON CARRIER TUNING SYSTEM

Filed April 30, 1947 2 Sheets-Sheet 1

INVENTOR
ROBERT J. COWLES

BY Arthur A. Smith

ATTORNEY

Aug. 1, 1950 R. J. COWLES 2,516,856

AUTOMATIC STOP-ON CARRIER TUNING SYSTEM

Filed April 30, 1947 2 Sheets-Sheet 2

INVENTOR
ROBERT J. COWLES
BY Arthur A. Smith
ATTORNEY

Patented Aug. 1, 1950

2,516,856

UNITED STATES PATENT OFFICE 2,516,856

AUTOMATIC STOP-ON CARRIER TUNING SYSTEM

Robert J. Cowles, Fort Wayne, Ind., assignor, by mesne assignments, to Farnsworth Research Corporation, a corporation of Indiana Application April 30, 1947, Serial No. 744,967

12 Claims. (Cl. 250—20)

Figure 1:
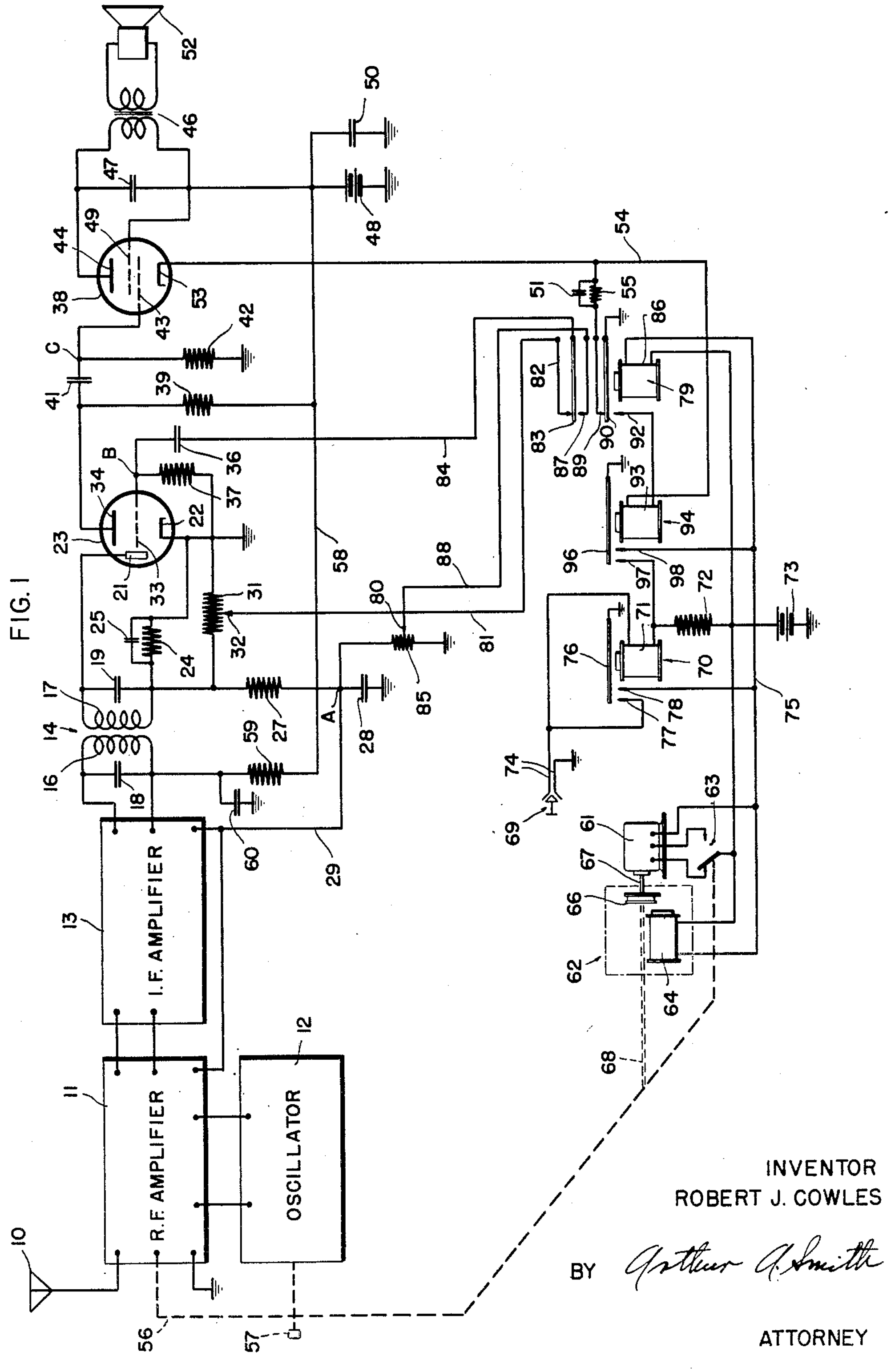

This invention relates to radio receivers and more particularly to automatic station selecting facilities for use in conjunction with radio receivers.

Of the many different types of automatically tuned radio receivers there is one type which does not require a presetting of the tuning mechanism, whereby to render it capable of automatically selecting a desired one of a plurality of stations. This one type which is more generally used perhaps than any of the others for certain particular installations is the so-called "stop-on-carrier" type of tuner. Essentially, it comprises a motor driven tuning machanism which is set into operation manually, whereby to change the station selecting facilities of the receiver continuously until the receiver is made responsive to the carrier wave from another station. Such receivers are additionally provided with apparatus which is responsive to the received carrier wave and which function to arrest the operation of the motor driven tuning mechanism.

One of the most popular forms of such automatic station selecting systems employs especially designed transformers and other auxiliary circuits, whereby to develop voltages representative of the condition of the receiver tuning for control purposes. Usually these receivers also employ a plurality of vacuum tubes in the control circuits to which the developed control voltages are applied.

Most, if not all, of such automatic station selecting apparatus require a modification of the conventional receiver circuits in order for it to be incorporated in the receiver. Therefore, in many cases compromises are necessary in the design of the receiver circuits which detract from the best performance of which the receiver might otherwise be capable. Furthermore, in these prior art systems, a number of vacuum tubes are required in the control circuits. The provision of such apparatus tends to complicate the receivers. Moreover, the requirement that special voltages be developed for the operation of the vacuum tubes included in the control circuits requires the use of additional, and in many cases, especially designed equipment such as transformers and the like.

It, therefore, is an object of the present invention to provide a radio receiver having a novel automatic station selecting facility which is relatively simple and which requires a minimum of alteration of the conventional receiver circuits.

Another object of the invention is to provide automatic station selecting apparatus for use in conjunction with a conventional radio receiver which may be adapted for use with substantially any conventional type of radio receiver.

In accordance with the present invention, there is provided a mechanically driven tuning mechanism and control apparatus therefor which may be coupled to the conventional circuits of the receiver. The receiver includes means for reproducing the intelligence signal modulated on any one of a plurality of carrier waves to which the receiver may be tuned. In order to effect a change in the receiver tuning, there is provided means for initiating operation of the tuning mechanism. The receiver also includes facilities for developing an electrical wave which is representative of the tuning of the receiver to any one of the plurality of carrier waves. The electrical wave is impressed upon a network which is capable of differentiating the wave so that it may be converted into a control impulse. The control impulse is impressed upon apparatus which is responsive thereto for the purpose of arresting the operation of the tuning mechanism, whereby the receiver is conditioned for response to one of the received carrier waves.

More specifically, in accordance with an illustrative embodiment of the invention, a manual switch may be provided for starting the tuning mechanism and also for operating a switch whereby the input circuit of a conventional audio signal amplifier is transferred from the audio signal output circuit of a detector to the output circuit of the detector wherein the automatic volume control voltage is developed. During a tuning operation this voltage is representative of the tuning of the receiver to one of the carrier waves. At the same time, the output circuit of the amplifier is transferred from its normal termination to one which includes apparatus for stopping the tuning mechanism. When coupled to the automatic volume control circuit of the detector, the input circuit of the audio signal amplifier functions to differentiate the detector voltage representative of the frequency response characteristic of the amplifier, whereby to develop an impulse in the output circuit of the amplifier. The impression of this impulse upon the apparatus provided for stopping the tuning mechanism energizes this apparatus so that it may perform its function.

For a better understanding of the invention, together with other and further objects thereof, reference is made to the following description, taken in connection with the accompanying drawings, and its scope will be pointed out in the appended claims.

In the drawings:

Fig. 1 is a partly schematic circuit diagram of a radio receiver provided with automatic station selecting facilities, in accordance with the present invention; and Figs. 2, 3, 4 and 5 are curves of the voltages and current developed at various points in the receiver for control of the automatic station selecting apparatus.

Referring now to Fig. 1 of the drawing there is shown a partly schematic block diagram of a conventional superheterodyne receiver circuit which has been adapted for automatic station selection. In general the upper half of the drawing illustrates receiver apparatus which is conventional in both design and operation. For the purpose of collecting carrier signal energy there is provided an antenna 10 which is coupled to the input of a radio frequency amplifier 11. There is also coupled to the input of amplifier 11 a local oscillator 12 whereby the amplifier may function as a frequency converter stage. The output of the radio frequency amplifier 11 is coupled to an intermediate frequency amplifier 13. An intermediate frequency transformer 14 is connected to the output of amplifier 13 and comprises a primary winding 16 and a secondary winding 17 which are resonated by capacitors 18 and 19, respectively.

A signal rectifying circuit is provided across the secondary winding 17 and embodies a diode consisting of an anode 21 and the cathode 22 of tube 23, together with a conventional two part diode load or output circuit. When a carrier signal is applied to this rectifying circuit, the resultant rectified signal voltage is conventionally employed for the dual purpose of providing an automatic volume control voltage and an audio frequency signal voltage. One part of the diode output circuit, therefore, is an audio signal channel or circuit consisting of a resistor 24 and a capacitor 25. The other part of the diode output circuit is an automatic volume control network comprising resistor 27 and a capacitor 28. This network has the requisite time constant for automatic volume control purposes. A conductor 29 is coupled between the automatic volume control network and the amplifiers 11 and 13 for the application of the biasing voltage for effecting the desired volume control.

For the purpose of manually varying the audio signal input voltage, a volume control resistor 31 is connected across the audio signal channel load resistor 24. The magnitude of the audio signal voltage to be employed is controllable by means of a wiping contact 32.

A section of the tube 23 is employed as a first audio amplifier stage and comprises the cathode 22, a grid 33 and another anode 34. The audio input signals are applied to the grid 33 through a coupling capacitor 36. A leak resistor 37 is connected between the grid 33 and ground. The coupling capacitor 36 and the grid resistor 37 normally serve to provide an audio coupling network with respect to the amplifier section of tube 23. However, as will be hereinafter explained, this network is also adapted to provide a signal differentiation function which is to be used for automatic station selecting purposes.

The audio amplifier also includes an output tube 38. For the purpose of applying the amplified audio signals to the tube 38, there is provided a conventional resistance coupled network comprising a plate load resistor 39, a coupling capacitor 41 and a grid load resistor 42 whereby the anode 34 of tube 23 is coupled to the grid 43 of tube 38. The anode 44 of the output tube 38 is coupled to the primary of an output transformer 46 for the purpose of applying the output signals to a loud-speaker 52. The primary winding of transformer 46 is by-passed by a capacitor 47 and is conventionally connected to the positive terminal of the plate power supply 48. The amplified signal output of tube 38 is applied through the output transformer 46 to the loud-speaker 52 resulting in the audible reproduction of the signals. The screen grid 49 of the tube 38 is connected to the positive terminal of the plate power supply 48. A by-pass capacitor 50 is also connected to the positive terminal of the plate power supply and is terminated to ground.

It will be noted that the cathode 53 of the tube 38 is connected to a cathode resistor 55 and to a conductor 54 both of which are coupled to the automatic station selector apparatus. A cathode current pulse may thereby be employed for accomplishing certain switching functions during a portion of the automatic tuning cycle, the operative details of which will be hereinafter more fully described.

For the purpose of resonating the receiver apparatus to the frequency of a carrier wave there is provided a linkage 56 which is coupled to the amplifier 11 and to the oscillator 12. For manually resonating the receiver a knob 57 is connected to the linkage 56 providing means whereby the frequency of amplifier 11 and oscillator 12 may be simultaneously varied in the conventional manner. It will also be noted that the requisite space current for the receiver apparatus is supplied by the plate power supply 48 and a conductive circuit comprising conductor 58, resistor 59 and by-pass capacitor 60. It will be evident that the aforegoing described receiver apparatus is substantially conventional in operation and that no further description thereof is required for an understanding of its operation.

In order to effect the automatic tuning of the radio receiver apparatus there is provided an electric motor 61 which is coupled to the tuning linkage 56 by means of an electromagnetic clutch 62. A motor reversing switch 63 is mechanically coupled to the linkage 56 for automatically reversing the direction of rotation of electric motor 61 when the tuning elements of the amplifier 11 and the oscillator 12 reach either end of a predetermined tuning band.

The electromagnetic clutch 62 comprises a solenoid 64 which, when energized, is adapted to effect mechanical engagement of the clutch element 66 whereby the motor shaft 67 is coupled to the clutch shaft 68. The clutch shaft, being mechanically coupled to the linkage 56, will impart a tuning movement to the amplifier 11 and the oscillator 12. The electric motor 61 and the clutch 62 are conductively connected in parallel and are adapted to be simultaneously energized or de-energized.

For the initial starting of the motor driven tuning mechanism there is provided a starting circuit comprising a starting switch 69, a motor control relay 70, a resistor 72 and a local battery 73. The manual operation of starting switch 69 effects the engagement of contacts 74, thereby completing a circuit from the local battery 73 through the resistor 72 and thence through the motor control relay winding 71, thus energizing this relay. The relay is provided with a movable contact member or armature 76 and a pair of fixed contacts 77 and 78. Engagement of the armature and the contact 77 provides a "hold-in" circuit whereby to maintain the relay operated independently of the starting switch 69 so that the switch may be released. The armature 76 also is held in engagement with the contact 78 during the "hold-in" period, providing means whereby the electric motor 61 and the magnetic clutch 62 remain energized.

The control circuit for the motor driven tuning mechanism also includes a switch relay 79 which, in its de-energized state, serves to maintain two receiver circuits normally operative. The first of these circuits is the audio input circuit to the grid 33 of tube 23. Normally, a conductor 81 applies the audio signal voltage from the volume control 31 to the fixed relay contact 82. The armature 83 of the relay 79 is in engagement with the contact 82 when the relay is de-energized so that the audio signal energy is impressed through a conductor 84 upon the coupling capacitor 36 and thence to the grid 33 of tube 23. It will be apparent that the energization of the winding 86 of switching relay 79 effects the disengagement of the armature 83 from the contact 82 and effects its engagement with another fixed contact 87. The audio input signal may thus be removed from the grid 33 and another voltage substituted therefor by reason of the connection of the contact 87 through a conductor 88 to a sensitivity control resistor 85.

The sensitivity control resistor 85 has one terminal grounded whereas the other terminal is connected to the junction point between resistor 27 and capacitor 28 whereby a portion of the voltage present in the automatic volume control circuit may be applied to the grid 33 during the automatic tuning cycle. The magnitude of this applied voltage may be controlled by the positioning of the movable arm 80. Thus the sensitivity control 85 may be employed to establish the magnitude of the signal pulse applied to grid 33, thereby providing means whereby the automatic tuning apparatus may be rendered responsive to weak or strong carrier signals.

The second circuit normally maintained operative by the de-energized relay 79 is the cathode return path of the audio output tube 38. It will be evident that the normal engagement of the relay contact 89 by the armature 90 serves to render the cathode 53 of tube 38 operative by the conventional connection of cathode resistor 55 to ground. The energization of winding 86 effects the disengagement of the relay switching members 89 and 90, thereby interrupting the normal cathode circuit through resistor 55. Energization of the winding 86 also establishes a new cathode return circuit by the engagement of the armature 90 with a fixed contact 92. The contact 92 is connected to the winding 93 of a tripping relay 94 which is thus effectively substituted for resistor 55 by reason of the winding being connected through conductor 54 to the cathode 53 of the tube 38.

The winding 93 of relay 94, when inserted in place of cathode resistor 55, is not energized by the normal cathode current flow but is adapted to be momentarily energized by the relatively large current pulse present in this circuit as the receiver apparatus approaches resonance with a carrier signal. The momentary energization of winding 93 actuates a grounded armature 96 of this relay into engagement with two fixed contacts 97 and 98. The resultant grounding of switch members 96 and 97 provides a short circuit across the winding 71 of the motor control relay 70, whereby this relay is released. Hence, the hold circuit of the motor control relay 70 is no longer effective and it is relieved of its motor controlling function. At the same time, however, the motor controlling function is now assumed by the tripping relay 94 by reason of the established engagement of the armature 96 and the contact 98, whereby the ground return circuit for motor 61 which was previously maintained by motor control relay 70, is momentarily maintained by tripping relay 94.

Before describing in detail the functioning of the automatic selecting mechanism consideration first will be given to the method whereby the necessary controlling potential is developed for stopping the tuning apparatus at resonance with a carrier signal.

Figure 2:
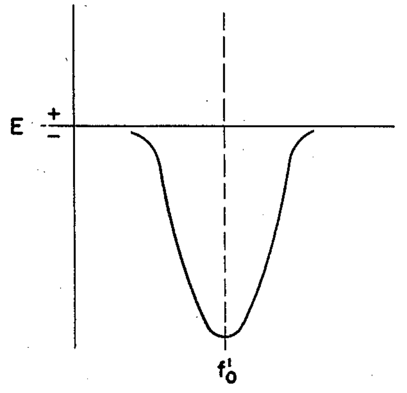

Reference is now had to the Figs. 2, 3, 4 and 5 which are representative of the transient voltages which are momentarily produced at various points in the receiver circuit as the receiver tuning elements are swept through a carrier signal. Fig. 2 is the instantaneous voltage versus frequency curve, which may be plotted from the voltages developed at point A of the automatic volume control circuit. This wave appears as a universal response curve having a single peak and, as such, is dependent upon the degree of coupling which exists between the primary 16 and secondary 17 of the intermediate frequency transformer 14. It is preferable that critical coupling, or slight undercoupling, be maintained between these windings since subsequent differentiation of this single peaked voltage will inherently establish a steep slope in the central portion of the differentiated wave form. It will be understood that overcoupling at the transformer 14 would tend to produce a double peaked wave form, the differentiation of which would produce erratic and undesirable effects in the differentiated wave form. The form of the curve as shown in Fig. 2 may also be affected, at point A by the time constants of the automatic volume control resistor 27 and capacitor 28 and therefore is dependent on the rate at which the tuning element travels through resonance with the carrier signal. The circuit constants must be arranged to provide for the removal of modulation effect, while at the same time the capacitor 28 serves to by-pass to ground all audio signal components which may be present in the automatic volume control circuit. In the present embodiment of the invention, resistor 27 may have a value of 1 megohm and the capacitor 28 may have a value of 0.05 microfarad to achieve the desired result.

Figure 3:
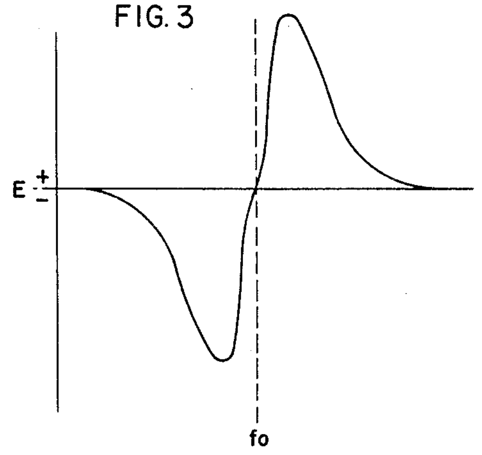

The impression of a voltage impulse having the form illustrated in Fig. 2, upon the coupling condenser 36 and its associated leak resistor 37 effects a differentiation of the curve shown in Fig. 2. It has been found that, when the capacitor 36 has a value of 0.005 microfarad and the resistor 37 has a value of 10 megohms, the time constant of the coupling circuit is suitable to impress the audio signal voltages upon the amplifier section of the tube 23. At the same time, the time constant of this coupling circuit is sufficiently small as compared to the period or time duration of a voltage impulse such as that illustrated in Fig. 2, to effect differentiation of the impulse. Consequently, a voltage having the form illustrated by the curve of Fig. 3 is impressed upon the control grid 33 of the amplifier tube when the input circuit of this tube is coupled to the automatic volume control circuit of the detector during a tuning cycle. As the voltage at the point A increases in magnitude to a peak at the resonant frequency $f_0$, the differentiation of this half of the curve of Fig. 2 is represented by the left hand or negative loop of the curve of Fig. 3. Similarly, as the voltage at the point A decreases from its maximum amplitude when the receiver is tuned away from the resonant point, the differentiation of the right hand half of the curve of Fig. 2 is represented by the right hand or positive loop of the curve of Fig. 3. It is to be noted that, at the point of resonance, when there is no change in the magnitude of the voltage developed at point A, the curve of Fig. 3 is at the point of crossing the axis between the negative and positive regions. The voltage which is represented by the curve of Fig. 3 is that developed at the point B and impressed upon the first stage of the audio amplifier.

Figure 4:
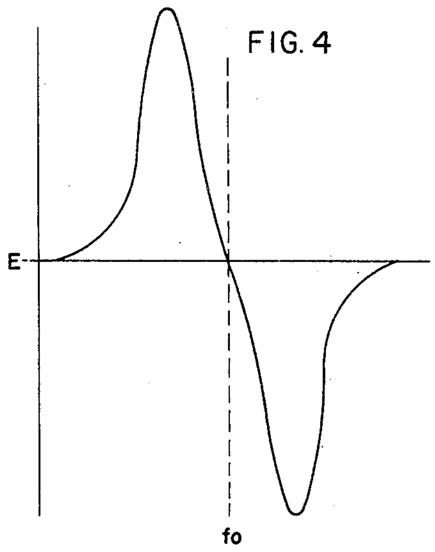

In order to develop sufficient energy for operating the tripping apparatus of the motor control mechanism, it usually is necessary to amplify somewhat the voltage which is developed at the point B. Some amplification is achieved in the tube 23 so that the voltage which is developed at the point C is represented by the curve of Fig. 4. It is to be noted that the phase of this curve is reversed to that of Fig. 3 owing to the conventional operation of the vacuum tube amplifier. However, the phase of the differentiated voltage wave is immaterial for the reason that the relay apparatus to be controlled thereby is responsive to current of either polarity.

The amplified differentiated voltage which is developed at the anode 34 of the tube 23 is impressed upon the resistive-capacitive coupling network comprising the capacitor 41 and the leak resistor 42 of the amplifier tube 38. In order to avoid additional differentiation by this coupling circuit, it is necessary that the circuit have a relatively large time constant. However, the time constant of this circuit must, at the same time, be such that the circuit is capable of coupling audio signal voltages to the grid 43 of the tube 38 during normal operation of the receiver. It has been found that this coupling circuit satisfies both the requirements when the capacitor value is 0.25 microfarad and the resistor value is 470,000 ohms. Experience with this circuit also has shown that the time constant is appropriate to improve somewhat the overall low frequency response of the audio output circuit.

Figure 5:
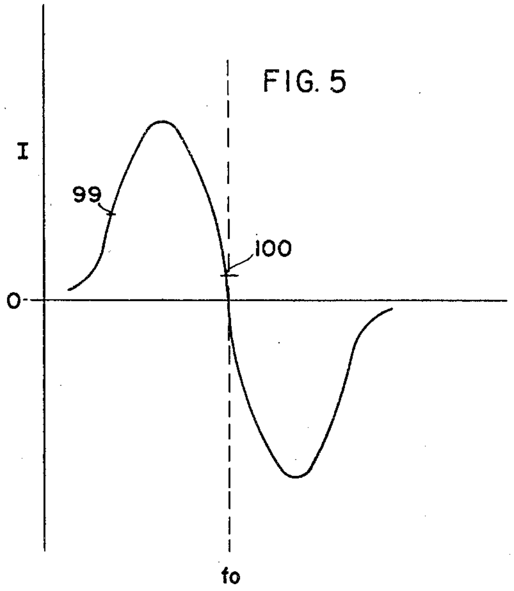

Fig. 5 illustrates the character of the transient current flow in the circuit of the cathode 53 of the tube 38 during the automatic tuning cycle. This current is caused to traverse the winding 93 of the tripping relay 94 whereby to stop the operation of the motor 61 in a manner to be described.

Referring now to Fig. 1 of the drawings particularly, there will be described the sequential operation of the automatic tuning system in accordance with the present invention. Assume that the radio receiver is tuned to a particular frequency corresponding to one of the carrier waves intercepted by the antenna 10. If now it is desired to change the receiver tuning so that it is capable of reproducing the signals transmitted on another carrier wave in an adjacent channel, the push-button starting switch 69 is actuated. A circuit is closed from the battery 73 through the winding 71 of the motor control relay 70 to ground at the contact 74 of the starting switch, thereby operating this relay. The relay is locked in an operated condition by the engagement of its armature 76 with the contact 77. The engagement of the armature with the contact 78 energizes the motor 61, the clutch operating solenoid 64 and the switching relay 79. The motor, through the clutch 66 and the linkage 56, operates the tuning mechanism of the receiver whereby its resonant frequency is changed. At the same time the operation of the relay 79 disconnects the grid 33 of the tube 23 from the audio signal circuit, including the resistor 31 and its associated sliding contact 32, and connects this grid to the sliding contact 80 of the resistor 85 included in the automatic volume control circuit. Simultaneously, the operation of the switching relay disconnects the cathode 53 of the amplifier tube 38 from its normal terminating circuit, including the resistor 55 and, instead, connects the cathode through the winding of the tripping relay 94 to ground.

As the receiver is tuned to the adjacent carrier frequency, the voltage represented by the curve of Fig. 2 is developed at the point A in the automatic volume control circuit. This voltage is differentiated in the manner described and impressed upon the point B of the audio amplifier in the form shown in Fig. 3. Consequently, there is produced a current in the circuit of the cathode 53 of tube 38 and in the winding 93 of the tripping relay 94 having the form shown in Fig. 5.

As this current increases in magnitude to a value such as that represented by the point 99 on the curve of Fig. 5, the tripping relay 94 is actuated. The engagement of its armature 96 with the contact 98 connects ground to the motor 61, the clutch magnet 64 and the winding 86 of the switching relay 79, thereby maintaining this apparatus energized. The engagement of the tripping relay armature with its contact 97 short circuits the winding 71 of the motor control relay 70, thereby effecting release of its armature 76. Even though the motor control relay no longer controls the automatic tuning mechanism, this apparatus is maintained in operation during the time required for the current impulse impressed upon the tripping relay to reach its maximum value and then to diminish to a magnitude such as that indicated by the point 100 on the curve of Fig. 5. At this point the tripping relay 94 is sufficiently de-energized to release its armature 96, thereby de-energizing the motor 61, the clutch magnet 64 and the switching relay 79. In this manner the receiver is restored to its normal operating state and is automatically tuned to resonance with the carrier wave of a different frequency.

It may be seen from an inspection of the curve of Fig. 5 that the automatic tuning operation is stopped substantially at the point that exact resonance with the carrier wave is reached. The apparatus provided for automatically tuning the receiver in accordance with this invention is capable of functioning dependably, chiefly for the reason that the slope of the controlling current wave, as shown in Fig. 5, is relatively great at the point where the receiver is tuned to resonate with the carrier wave.

It should be noted that the curves of Figs. 2, 3, 4 and 5 are predicated upon varying the tuning facilities in such a manner that a continuous sweep is made completely through the frequency region of a carrier wave. However, in the operation of the tuning control apparatus as described, the receiver is not tuned beyond the point at which it is in accurate resonance with a carrier wave. Therefore, a voltage having a wave shape corresponding to only one half of the curve of Fig. 2 will be produced at the point A of the receiver. The particular half of this curve that is developed will depend upon whether the responsive frequency of the receiver is being increased or decreased. In any case, the left hand or positive loop of the curve of Fig. 5 will be developed in the cathode circuit of the tube 38 for effecting the described control function of stopping the tuning operation.

The fact that the foregoing description of the automatic station selection mechanism is directed to an amplitude modulated radio receiver of the superheterodyne type is not to be considered as a limitation inasmuch as receivers of the tuned radio frequency type, frequency, or phase modulated types are equally adaptable to the system herein disclosed.

While there has been described what, at present, is considered the preferred embodiment of the invention, it will be obvious to those skilled in the art that various changes and modifications may be made therein without departing from the invention, and it therefore, is aimed in the appended claims to cover all such changes and modifications as fall within the true spirit and scope of the invention.

What is claimed is:

1. In a radiant energy receiver, means for recovering and reproducing the intelligence signal modulated on any one of a plurality of carrier waves, a mechanically driven tuning mechanism for varying the resonant frequency of said receiver to selectively receive said carrier waves, means for initiating operation of said tuning mechanism, means in said receiver for developing an electrical wave representative of the tuning of said receiver to any one of said carrier waves, a differentiation network coupled to said wave developing means for converting said electrical wave into a control impulse, and means coupled to said network and responsive to said control impulse for arresting the operation of said tuning mechanism.

2. In a radio receiver, a motor driven tuning mechanism, means for initiating operation of said tuning mechanism, a source of a single peaked transient voltage representative of the tuning of said receiver to a carrier wave, means including a resistive-capacitance network for differentiating said transient voltage, and means controlled by said differentiated voltage for arresting the operation of said tuning mechanism.

3. In a radio receiver, a motor driven tuning mechanism, manually operable means for initiating operation of said tuning mechanism, a source of voltage representative of the tuning of said receiver to a carrier wave, a resistive-capacitive network coupled to said source of voltage for differentiating said voltage, means for amplifying said differentiated voltage, and means responsive to said amplified voltage for arresting operation of said tuning mechanism.

4. In a radio receiver, a motor driven tuning mechanism, manually operable means for initiating operation of said tuning mechanism, a source of audio signals, a source of a single peaked voltage impulse representative of the tuning of said receiver to a carrier wave, an amplifier normally coupled to said source of audio signals, means responsive to the initiation of operation of said tuning mechanism to disconnect said amplifier from said source of audio signals and to couple said amplifier to said voltage impulse source, means coupled between said voltage impulse source and said amplifier for differentiating said voltage impulse, and means responsive to said differentiated voltage to arrest the operation of said tuning mechanism and to restore said amplifier circuit to normal.

5. In a radio receiver, a source of audio signals, a source of automatic volume control voltage, an audio signal amplifier having a resistive-capacitive input circuit normally coupled to said source of audio signals, a motor driven tuning mechanism, relay means operable to initiate operation of said tuning mechanism and to switch said audio amplifier input circuit from said source of audio signals to said source of automatic volume control voltage, a circuit closing device to operate said relay means, and second relay means coupled to said audio signal amplifier and responsive to the tuning of said receiver to a carrier wave for rendering said first relay means inoperative, whereby to restore said receiver to normal.

6. In a radio receiver, a motor driven tuning mechanism, a signal detector provided with a first output circuit having a relatively short time constant and a second output circuit having a relatively long time constant, an audio amplifier having an input circuit normally coupled to said first output circuit, means for initiating operation of said tuning mechanism and for concomitantly uncoupling said audio amplifier input circuit from said first output circuit and coupling it to said second output circuit, means including the input circuit of said audio amplifier for differentiating the characteristic frequency response voltage of said receiver whereby to generate a control voltage impulse, and means responsive to said control voltage impulse for stopping said tuning mechanism and for restoring said audio amplifier input circuit to its normal coupling to said first detector output circuit.

7. In a radio receiver, means for demodulating a received carrier wave to recover the audio signal and to develop an automatic volume control voltage, an audio signal amplifier having an output circuit and a resistive-capacitive input circuit normally coupled to amplify said audio signal, a motor driven tuning mechanism, switching means operable to initiate operation of said tuning mechanism, to render said audio signal amplifier unresponsive to said audio signal and responsive to said automatic volume control voltage, and to disconnect the output circuit of said audio signal amplifier, a circuit closing device to operate said switching means, and relay means connectable by said switching means to the output circuit of said audio signal amplifier and operable in response to the tuning of said receiver to a carrier wave for rendering said switching means inoperative, whereby to restore said receiver to normal.

8. In a radio receiver, a signal detector for demodulating a received carrier wave to recover the audio signal, an audio signal output circuit and an automatic volume control output circuit coupled to said detector, an audio signal amplifier having a normal output circuit and a resistive-capacitive input circuit normally coupled to said audio signal circuit, a motor driven tuning mechanism, relay means operable to initiate operation of said tuning mechanism to switch said audio signal amplifier input circuit from said audio signal circuit to said automatic volume control circuit and to disconnect the normal output circuit of said audio signal amplifier, manual means to operate said relay means, and a tripping relay connectable by said relay means to the output circuit of said audio signal amplifier, said tripping relay being operable in response to the tuning of said receiver to a carrier wave for rendering said relay means inoperative, whereby to stop said tuning mechanism and to restore said amplifier circuits to their normal connections.

9. In a radio receiver, a signal detector for demodulating a received carrier wave to recover the audio signal, an audio signal output circuit and an automatic volume control output circuit coupled to said detector, an audio signal amplifier having a normal output circuit and a resistive-capacitive input circuit normally coupled to said audio signal output circuit, a motor driven tuning mechanism, a control relay coupled to said tuning mechanism for initiating operation of said tuning mechanism, a switching relay operable to switch said audio signal amplifier input circuit from said audio signal output circuit to said automatic volume control output circuit and to disconnect the normal output circuit of said audio signal amplifier, manual switch means to operate said control relay and said switching relay, and a tripping relay connectable by said switching relay to the output circuit of said audio signal amplifier, said tripping relay being operable in response to the tuning of said receiver to a carrier wave for rendering said control relay and said switching relay inoperative, whereby to stop said tuning mechanism and to restore said amplifier circuits to their normal connections.

10. In a radio receiver, a motor driven tuning mechanism, a signal detector having an audio signal output circuit and an automatic volume control output circuit, manually controlled first relay means for initiating operation of said tuning mechanism, an audio signal amplifier having an output circuit and a resistive-capacitive input circuit, second relay means operable by said first relay means to switch the input circuit of said audio signal amplifier from said audio signal output circuit to said automatic volume control output circuit and to interrupt the normal output circuit of said audio signal amplifier, third relay means coupled to said second relay means for connection in the output circuit of said audio signal amplifier, said resistive-capacitive circuit, when coupled to said automatic volume control circuit serving to differentiate the characteristic frequency response voltage of said receiver, whereby to impress an operating voltage impulse upon said third relay means, and said third relay means being coupled to said first relay means and to said second relay means to restore them to their unoperated conditions.

11. Control apparatus for automatic station selecting facilities in a radio receiver comprising, a mechanically driven tuning mechanism, means for initiating operation of said tuning mechanism, means in said radio receiver for developing an electrical impulse representative of the tuning of said receiver to a carrier wave, a network coupled to said voltage developing means for differentiating said voltage impulse to produce a control impulse, and means coupled to said network for employing said control impulse to arrest the operation of said tuning mechanism.

12. Control apparatus for automatic station selecting facilities in a radio receiver comprising, a motor driven tuning mechanism, means for intermittently initiating operation of said tuning mechanism, means in said radio receiver for developing a transient voltage representative of the tuning of said receiver to a carrier wave, means including a reactive network for differentiating said transient voltage, and means coupled to said network for arresting the operation of said tuning mechanism at a time when the receiver is accurately resonated to a carrier wave.

ROBERT J. COWLES.

REFERENCES CITED

The following references are of record in the file of this patent:

UNITED STATES PATENTS

| Number | Name | Date |
|---|---|---|
| 1,949,136 | Adair | Feb. 27, 1934 |
| 2,063,295 | Broaden | Dec. 8, 1936 |
| 2,098,331 | Bowman | Nov. 9, 1937 |
| 2,174,566 | Case | Oct. 3, 1939 |
| 2,231,806 | Goldsborough | Feb. 11, 1941 |
| 2,262,218 | Andrews | Nov. 11, 1941 |
| 2,426,580 | O'Brien | Aug. 26, 1947 |